(12) United States Patent
Cairns et al.

(10) Patent No.: US 7,873,098 B2
(45) Date of Patent: Jan. 18, 2011

(54) ROBUST MULTICODE DETECTOR FOR HSDPA

(75) Inventors: Douglas A. Cairns, Durham, NC (US); Yi-Pin Eric Wang, Cary, NC (US); Gregory E. Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 907 days.

(21) Appl. No.: 11/739,126

(22) Filed: Apr. 24, 2007

(65) Prior Publication Data

US 2008/0267265 A1 Oct. 30, 2008

(51) Int. Cl.
 *H04B 1/00* (2006.01)
(52) U.S. Cl. .............. 375/148; 375/150; 375/260; 375/267; 375/368; 370/335
(58) Field of Classification Search ............. 375/368, 375/148, 150; 370/335
 See application file for complete search history.

(56) References Cited

U.S. PATENT DOCUMENTS

| | | | | |
|---|---|---|---|---|
| 6,724,809 | B2 * | 4/2004 | Reznik | 375/148 |
| 6,816,541 | B1 * | 11/2004 | Schmidl | 375/148 |
| 7,492,809 | B2 * | 2/2009 | Wang et al. | 375/150 |
| 2002/0051433 | A1 * | 5/2002 | Affes et al. | 370/335 |
| 2006/0280273 | A1 * | 12/2006 | Mueller-Weinfurtner | 375/368 |
| 2008/0267261 | A1 * | 10/2008 | Wang et al. | 375/148 |
| 2008/0267265 | A1 * | 10/2008 | Cairns et al. | 375/150 |

OTHER PUBLICATIONS

S. Verdu; Multiuser Detection: Cambridge University Press; Sec. 6.2, 6.4 and 7.3; 1998; pp. 291-298, 306-314 & 361-369.*

Kim et al.; Linear MMSE Space-Time Equalizer for MIMO Multicode CDMA Systems; IEEE Transcations on Communications; Oct. 2006; pp. 1710-1714.*

Verdu, S. Multiuser Detection, Cambridge, UK: Cambridge University Press, 1998.

Hansen, H. et al. "High Capacity Downlink Transmission with MIMO Interference Subspace Rejection in Multicellular CDMA Networks." EURASIP Journal on Applied Signal Processing, vol. 5, pp. 707-726, 2004.

Co-pending U.S. Appl. No. 11/566,756, filed Dec. 5, 2006.
Co-pending U.S. Appl. No. 11/739,924, filed Apr. 25, 2007.
Co-pending U.S. Appl. No. 11/935,840, filed Nov. 7, 2007.

* cited by examiner

*Primary Examiner*—Sudhanshu C Pathak
(74) *Attorney, Agent, or Firm*—Coats & Bennett, P.L.L.C.

(57) ABSTRACT

Detecting a symbol of interest comprises despreading a received signal to obtain despread values corresponding to the symbol of interest and to one or more interfering symbols, combining the despread values to generate combined values for the symbol of interest and the interfering symbols, computing spreading waveform correlations between the spreading waveform for the symbol of interest and the spreading waveforms for the interfering symbols, computing interference rejection terms representing the interference present in the combined value for the symbol of interest attributable to the interfering symbols based on the spreading waveform correlations, and generating an estimate of the symbol of interest by combining the combined values with the interference rejection terms. The interference rejection terms are computed by scaling the spreading waveform correlations by corresponding signal powers and compensating the estimates for noise. This provides a robust interference model that avoids numerical problems associated with conventional joint detection.

16 Claims, 6 Drawing Sheets

ROBUST MULTICODE DETECTOR FOR HSDPA

BACKGROUND

One challenge to obtaining high data transmission rates in Code Division Multiple Access (CDMA) systems, such as Wideband CDMA and IS-2000, is interference due to channel dispersion. Performance in CDMA systems is sensitive to multi-path dispersion when a low spreading factor and/or multi-code is used for transmitting data. With dispersion, there are multiple echoes of the transmitted signal with different relative delays. These echoes interfere with one another. Not only is orthogonality lost between successive symbols as one symbol overlaps with the next, but orthogonality is also lost between symbols sent on different, orthogonal codes.

Generalized RAKE (GRAKE) receivers have been developed for better suppressing interference. Interference suppression is achieved by treating Intersymbol Interference (ISI) and Multiple Access Interference (MAI) as colored Gaussian noise. The noise correlation across fingers is then exploited by adapting the finger delays and combining weights. In this way, the orthogonality between user signals may be partially restored. Recently, further improvements in GRAKE receivers have been proposed for the High Speed Downlink Packet Access (HSDPA) mode of WCDMA that take into account code cross correlations.

Multi-user detection techniques have also been used to suppress MAI and ISI due to channel dispersion. Various types of multi-user detectors are known. The optimal multi-user detector is a Maximum Likelihood Sequence Estimation (MLSE) detector. However, the complexity of an MLSE detector grows exponentially with the number of users and is therefore not practical to implement. Therefore, there is interest in developing suboptimal detectors that obtain good performance with low complexity.

One suboptimal multiuser detector is the linear minimum mean squared error (LMMSE) detector. However, the MMSE detector has a number of drawbacks. One drawback is the need to know all of the active codes. This requirement is not a problem for a base station, but is difficult to achieve for a mobile terminal. Another drawback to a conventional MMSE approach is the need to perform matrix inversion to estimate symbols. The matrix inversion operations make computations difficult in some circumstances.

SUMMARY

The present invention relates generally to the detection of received signals in a CDMA system in the presence of interference caused by channel dispersion. Multi-user detection techniques are used to suppress Multiple Access Interference (MAI) and Intersymbol Interference (ISI). Interference rejection terms are computed and used to reduce MAI and ISI in symbols of interest. The computation of the interference rejection terms uses a robust interference model in which correlations between the effective spreading waveforms for symbols of interest and interfering symbols are computed, scaled by corresponding signal powers, and compensated for noise to obtain the interference rejection terms. The computation of the interference rejection terms avoids numerical problems encountered in conventional multi-user detectors.

In one exemplary embodiment, a receiver includes a RAKE receiver followed by a joint detector, such as a Minimum Mean Squared Error (MMSE) detector for detecting one or more symbols of interest. The RAKE receiver comprises a plurality of RAKE fingers for despreading a received signal to generate despread values, and a plurality of RAKE combiners to combine the despread values to generate RAKE combined values. The joint detector includes a correlation estimator to compute spreading waveform correlations between the spreading waveform for a symbol of interest and the spreading waveforms for one or more interfering symbols, an interference estimator for computing interference rejection terms based on the spreading waveform correlations and signal powers, and a symbol estimator for generating an estimate of the symbol of interest by combining the combined values with the interference rejection terms. The interference estimator computes the interference rejection terms by scaling the spreading waveform correlations by corresponding signal powers and compensating for noise. The interference estimator uses a robust interference model that avoids numerical problems associated with conventional joint MMSE detectors. In another exemplary embodiment, the receiver comprises a successive interference cancellation receiver or a parallel interference cancellation receiver.

DETAILED DESCRIPTION

Figure 1:
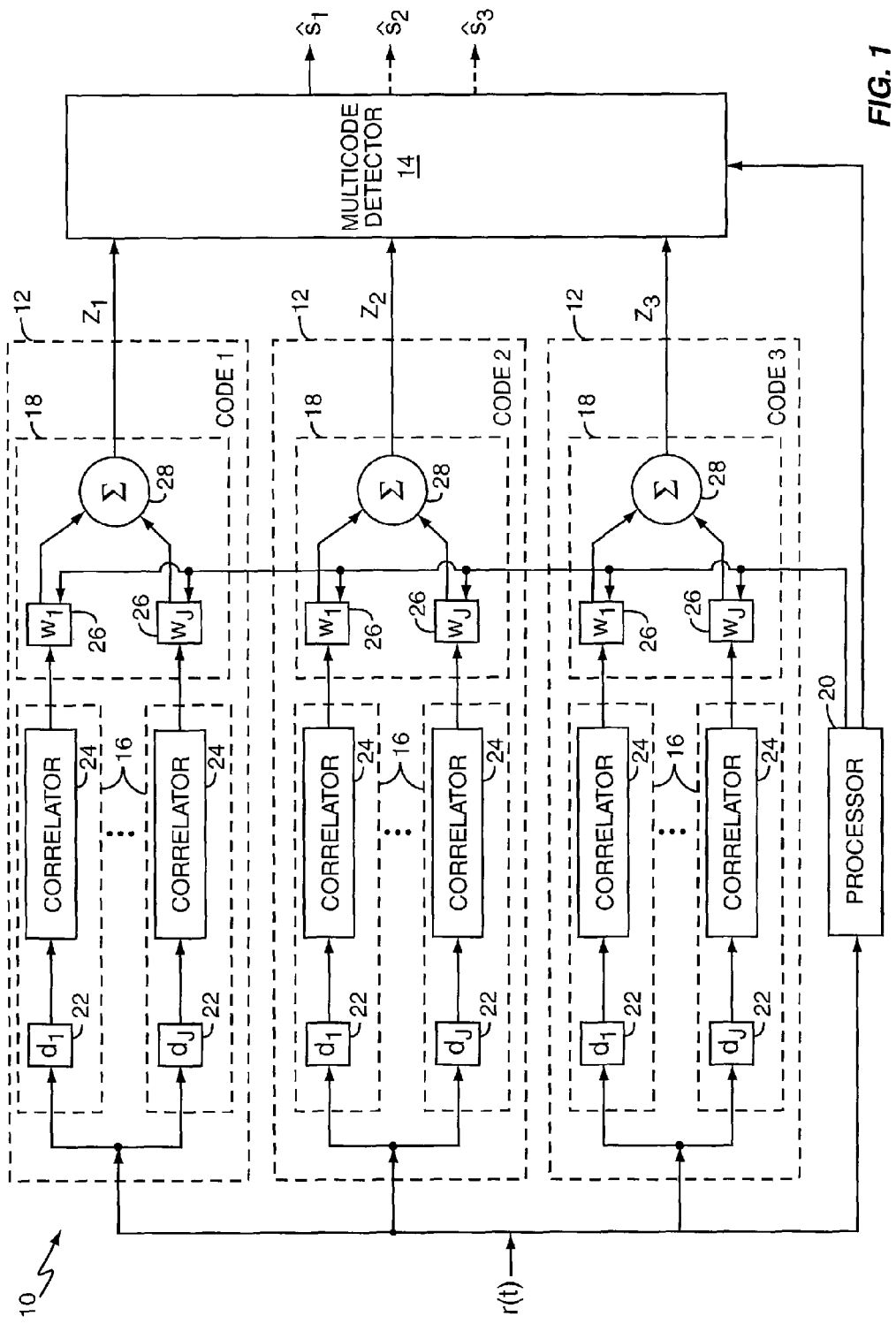
FIG. 1 illustrates an exemplary receiver in a mobile communication system.

Referring now to the drawings, FIG. 1 illustrates a block diagram of a multicode receiver 10 according to one exemplary embodiment for jointly detecting signals in a composite received signal transmitted on different spreading codes. Receiver 10 comprises a RAKE receiver 12 for each code to despread the composite received signal and to generate combined values corresponding to each spreading code, and a multicode detector 14 for jointly detecting symbols transmitted on the code channels of interest. The RAKE receiver 12 may comprise a conventional RAKE receiver or a generalized RAKE (G-RAKE) receiver. The multicode detector 14 may comprise a linear Minimum Mean Squared Error (MMSE) detector. The exemplary embodiment of the receiver 10 described more fully below is configured for the High Speed Downlink Packet Access (HSDPA) mode in a Wideband Code Division Multiple Access (WCDMA) system. The receiver 10 may be deployed in a base station or a mobile terminal.

Each RAKE receiver 12 comprises a plurality of RAKE fingers 16, a plurality of RAKE combiners 18, and a RAKE processor 20. Each RAKE finger 16 processes different time shifts or multi-path echoes of the received signal r(t). Typically, each RAKE finger 16 comprises a delay element 22 and a correlator or despreader 24. Delay elements 22 delay the received signal r(t) to time align the multi-path echoes processed by each RAKE finger 16. Correlators 24 correlate the delayed signals with a spreading code to extract the assigned multi-path echoes from the received signal r(t). Despread values from correlators 24 are combined in combiner 18. Combiner 18 typically includes weighting elements 26 and summer 28. Weighting elements 26 weight the multi-path echoes output from respective correlators 24. The weighted multi-path echoes are summed symbol-by-symbol by summer 28 to form a RAKE combined value during each symbol period. Those skilled in the art will appreciate that the combining weights associated with weighting elements 26 may correspond to the conjugates of the multiplying coefficients of the multi-path echoes (RAKE) or conjugates of weights that depend on the coefficients and a noise correlation matrix (G-RAKE). The combining weights are computed by the processor 20. Each RAKE combined value represents a symbol of interest or an interfering symbol. It should be noted that the symbols of interest also interfere with one another. Therefore, when a given symbol of interest is considered, the other symbols of interest may be considered as interfering symbols.

The vector of RAKE combined values, denoted z, output by the RAKE receiver 12 can be expressed as:

$$z = RAs + n, \qquad \text{Eq. (1)}$$

where $s = (s_0, \ldots, s_{K-1})^T$ is a vector of symbols to be considered for joint detection, and $A = \text{diag}(A_0, \ldots, A_{K-1})$ is a diagonal matrix with the $k^{th}$ element corresponding to the received amplitude for $s_k$, R is a waveform correlation matrix, and n is a vector of the noise. The vector z includes both symbols of interest and interfering symbols. The elements of R are the cross-correlations of the effective spreading waveforms of the symbols in s with each other and with themselves. The element in R relating the combined value $z_u$ with the symbol $s_v$ is given by:

$$R(u,v) = \int_{-\infty}^{\infty} f_u^H(t) f_v(t) dt, \qquad \text{Eq. (2)}$$

where $f_u(t) = [f_{u,0}(t), f_{u,1}(t), \ldots, f_{u,Q-1}(t)]^T$ is the effective waveform for symbol $s_u$, with each element corresponding to each receive antenna q. The number of receive antennas equals Q. The effective spreading waveform considered is a combination of the transmit waveform, radio channel impulse response, and receive filtering, which includes receive chip filtering, despreading, and RAKE combining. It can be demonstrated that $\sigma^2 R$ is the covariance of the noise vector n, where $\sigma^2$ is the noise variance at the input of the RAKE receiver 12.

The combined values output by the RAKE receiver 12 are corrupted by multiple access interference (MAI) and intersymbol interference (ISI) due to channel dispersion. In the case of MAI, the symbols transmitted on different codes interfere with one another. In the case of ISI, channel dispersion cause symbols transmitted over the same code to interfere with one another. It should be noted that multipath propagation may cause a transmitted symbol to interfere with itself. The multicode detector 14 employs multiuser detection techniques to suppress MAI and ISI due to channel dispersion and to generate estimates of the transmitted symbols. The term multicode detector is used rather than multiuser detector because the symbols transmitted may belong to the same user, or to different users. The multicode detector 14 employs a sliding window approach in which combined values received over multiple codes during multiple symbol periods are processed to produce symbol estimates for a current symbol period.

The optimal multi-user detector (or multicode detector) is a Maximum Likelihood Sequence Estimation (MLSE) detector. However, the complexity of an MLSE detector grows exponentially with the number of users and is therefore not practical to implement. There are a number of suboptimal multicode detectors that obtain good performance with low complexity. One such suboptimal detector is the decorrelator, which is given by:

$$M = R^{-1}, \qquad \text{Eq. (3)}$$

where symbol estimates are obtained from $\hat{s} = Mz = R^{-1}z$. The decorrelator performs poorly when noise becomes a significant portion of the overall impairment. Another suboptimal detector is the MMSE detector, which is given by:

$$M = A^{-1}[R + \sigma^2 A^{-2}]^{-1}, \qquad \text{Eq. (4)}$$

where symbol estimates are obtained from $\hat{s} = Mz$.

Implementation of the conventional MMSE detector represented by Eq. (4) has several limitations. First, the MMSE detector requires knowledge of all active codes. This requirement can be met at a base station in a mobile communication network, but is difficult to meet at a mobile terminal. Second, the interference model in the conventional MMSE detector includes the terms $A^{-1}$ and $A^{-2}$, which are diagonal matrices representing respectively the reciprocal of the signal amplitudes and signal amplitudes squared. Small amplitude values can lead to numerical problems when computing M. One problem is that the dynamic range needed to represent the reciprocal of the amplitude or amplitude squared can be extremely large. These large values may require double-precision floating point arithmetic, which is generally not available in the baseband processor for a mobile terminal. Further, the potentially large values can make operations such as matrix inversion or solving a system of linear equations numerically complex or intractable. Finally, in an MMSE detector, the size of the matrix M varies as the number of HSDPA active codes assigned to the HSDPA user varies. Thus, software or hardware that performs calculations must be able to cope with varying matrix sizes. It would be simpler and more efficient to use a matrix of a fixed size so that the software/hardware that performs calculations can be optimized for the fixed matrix size.

According to one exemplary embodiment, multicode detector 14 comprises a modified MMSE detector to overcome some of the difficulties encountered with conventional MMSE detectors. The MMSE detector according to one exemplary embodiment employs a new interference model, referred to herein as the robust MMSE approach, that overcomes some of the numerical issues with the conventional MMSE approach. The robust MMSE approach also enables the concept of a "virtual user" for HSDPA so that the MMSE detector can be implemented in a mobile terminal. The MMSE detector using the robust MMSE approach treats any spreading codes not assigned to the mobile terminal as belonging to another virtual HSDPA user. With this assumption, it is possible to implement the MMSE detector at the mobile terminal.

In one exemplary embodiment, the estimated symbols $\hat{s}$ may be computed from $\hat{s} = Mz$ where $M = \Gamma T^{-1}$. This approach is referred to herein as the robust Verdu approach. The term $\Gamma$ is a per code scaling factor that can be dropped without compromising demodulation, and may be given by:

$$\Gamma = \frac{A}{N_0}, \qquad \text{Eq. (5)}$$

where the matrix A represents a diagonal matrix having signal amplitudes on the diagonal and $N_0$ represents the noise power. The matrices M and T are referred to herein as interference rejection matrices. The elements of T represent interference rejection terms obtained by computing the effective spreading waveform correlations, scaling the effective waveform correlations by corresponding signal powers, and compensating for noise. In one exemplary embodiment, the matrix T is given by:

$$T = R\frac{A^2}{N_0} + I, \qquad \text{Eq. (6)}$$

where R is the effective spreading waveform correlation matrix representing correlations of the effective spreading waveforms, $A^2$ is a signal power matrix with signal powers on the diagonal, and I is the identity matrix. Note: $A^2/N_0$ is a diagonal matrix of signal-to-noise ratio (SNR) values. Equivalently, the term $\Gamma$ may be given by $$\Gamma = A \qquad \text{Eq. (7)}$$

and the matrix T may be given by:

$$T = RA^2 + N_0 I. \qquad \text{Eq. (8)}$$

The performance of the robust Verdu approach is identical to that obtained using the conventional MMSE approach shown by Eq. (4). However, the robust Verdu approach can tolerate small signal amplitude values. In the robust Verdu approach, the small signal amplitude values simply scale the code contribution to a particular symbol and do not appear in the denominator of any term. The robust Verdu form also enables the virtual user concept, so that it may be implemented in the mobile terminal.

In a second exemplary embodiment of the multicode detector 14, the estimated symbols ŝ are computed from Tŝ=z, where T is obtained from Eq. (6) or Eq. (8). This embodiment recasts the problem of joint detection as a system of linear equations and is referred to herein as the robust linear systems approach. The robust linear systems approach avoids the matrix inversion in the robust Verdu approach and can employ numerically stable methods for solving systems of linear equations. This can be advantageous when the matrix T is near singular because numerically stable linear system solvers will typically provide useful results, whereas matrix inversion may not.

Figure 2:
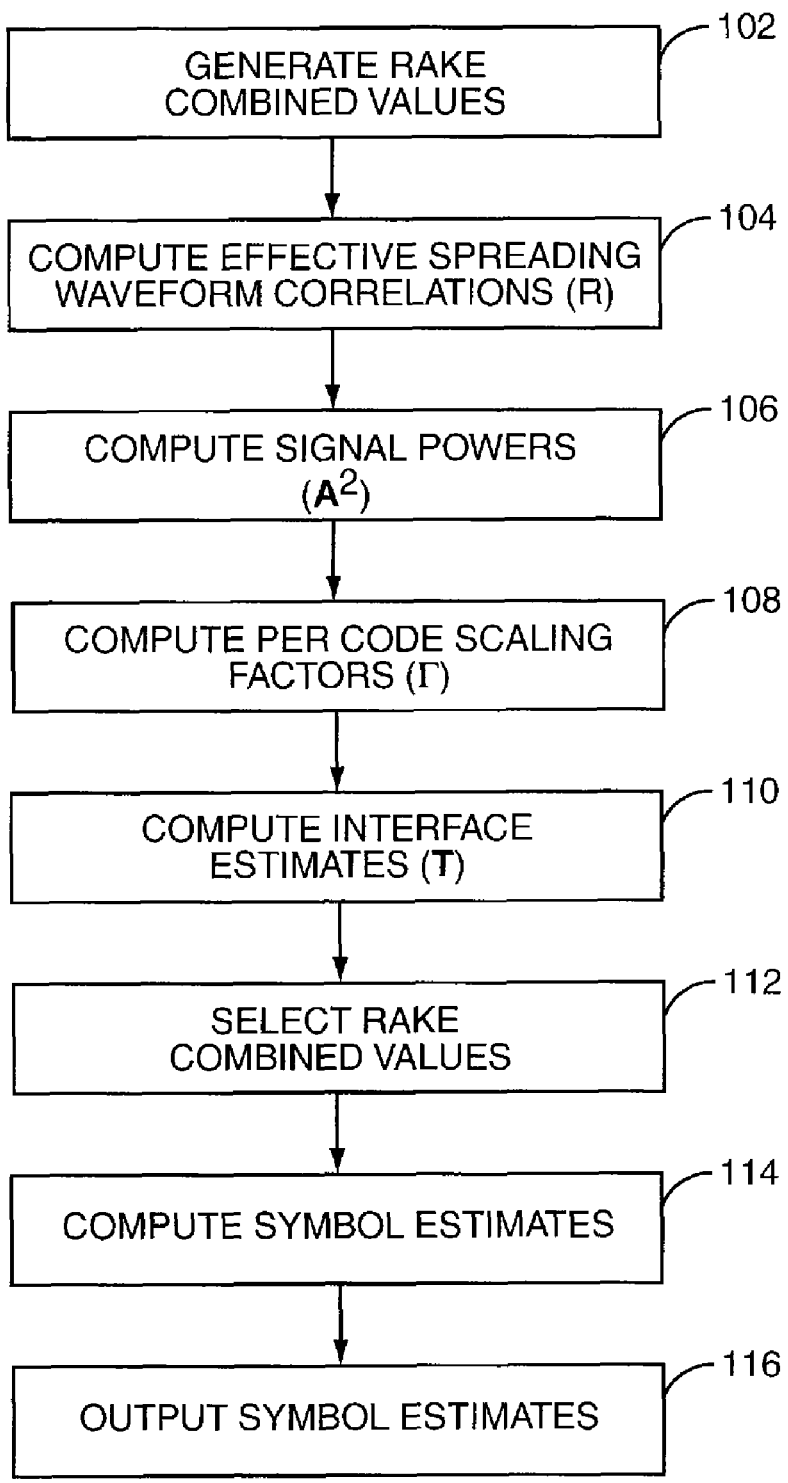
FIG. 2 illustrates an exemplary method for jointly detecting symbols transmitted over multiple code channels.

FIG. 2 illustrates exemplary process steps for implementing the robust Verdu approach to joint detection. The received signal is despread and the despread values are RAKE combined to generate RAKE combined values (block 102). The waveform correlation matrix R is then computed based on the known spreading codes and estimates of the channel (block 104). Elements of the waveform correlation matrix R may be computed according to:

$$R(u, v) = \qquad \text{Eq. (9)}$$

$$\sum_{q=0}^{Q-1} \sum_{l_1=0}^{L^{(i(u))}} \sum_{l_2=0}^{L^{(i(v))}} \sum_{m_0=0}^{N_{k(u)}^{(i(u))}-1} \sum_{m_1=0}^{N_{k(v)}^{(i(v))}-1} (g_q^{(i(u))}(l_1))^* g_q^{(i(v))}(l_2) (c_{k(u),j(u)}^{(i(u))}(m_0))^*$$

$$c_{k(v),j(v)}^{(i(v))}(m_1) \times R_p((j(u)N_{k(u)}^{(i(u))} - j(v)N_{k(v)}^{(i(v))} + m_0 - m_1)$$

-continued
$$T_c + \tau^{(i(u))}(l_1) - \tau^{(i(v))}(l_2) + o^{(i(u))} - o^{(i(v))})$$

where the terms in Eq. (9) have the following definitions. The index q indicates the receive antenna and ranges from 0 to Q−1. Indices $m_0$ and $m_1$ represent chip indices. Indices $l_1$ and $l_2$ represent path delays and $L^i$ represents the number of paths for each transmitter. The term $g_q^{(i)}(l)$ is the complex channel coefficient for the $l^{th}$ path for transmitter i and antenna q, and $\tau^{(i)}(l)$ is the path delay for the $l^{th}$ path. The term $o^{(i)}$ is the transmit time offset for transmitter i, and $N_k^{(i)}$ is the spreading factor for code k and transmitter i. $T_c$ is the chip period and $c_{k,j}^{(i)}$ is the spreading sequence (scrambled Walsh code) for code k, transmitter i, and symbol period j. $R_p(\lambda)$ is the value of the chip pulse shape autocorrelation function for argument $\lambda$. The transmitter index $i(u) = \lfloor \mod(u, KM)/K \rfloor$. The code index $k(u) = \mod(u/K)$. The symbol period index $j(u) = \lfloor u/(KM) \rfloor$. Eq. (9) applies to symbols transmitted through the same channel (e.g., own-cell interference in the downlink). Waveform correlations for symbols traveling through different channels (e.g., other-cell interference in the downlink) may be computed by replacing one set of complex channel coefficients and path delays with the set corresponding to the different channel.

The matrix A is computed in a manner known in the art and used to compute $A^2$ (block 106). Exemplary techniques for computing A are described in pending U.S. patent application Ser. No. 11/566,756 filed Dec. 5, 2006, which is incorporated herein by reference. The per code scaling factor is optionally computed using Eq. (5) or Eq. (7) (block 108). As noted previously, this step may be omitted without compromising demodulation. Matrix T is computed using either Eq. (6) or Eq. (8) (block 110). More particularly, the matrix T is computed by using $A^2$ to scale the effective spreading waveform matrix R and compensating for noise. In Eq. (6), the effective waveform correlation matrix R is scaled by $$\frac{A^2}{N_0}$$

and then the identity matrix I is added. In Eq. (8) the product $RA^2$ is initially computed that then compensated for noise by adding $N_0 I$.

Figure 3:
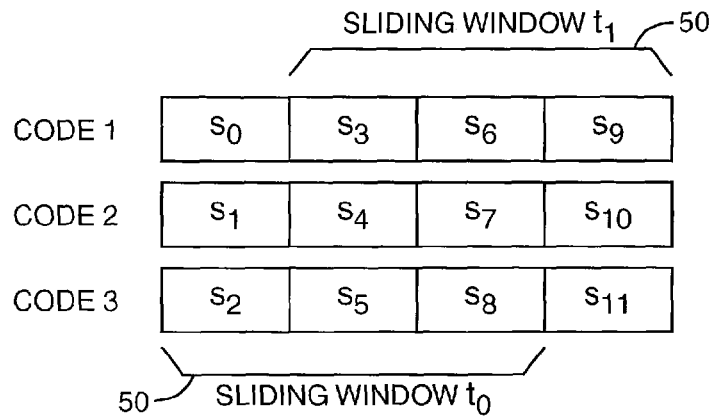
FIG. 3 illustrates multiple symbols received over multiple codes during multiple symbol periods relative to a sliding window.

While the matrix T is being obtained, a vector z of RAKE combined symbols received over multiple codes during multiple symbol periods is formed (block 112). A sliding window approach is used to select the RAKE combined values as illustrated in FIG. 3. FIG. 3 illustrates symbols received over three codes during four symbol periods. During each symbol period, the symbols in the sliding window 50 are selected and stacked to form the combined value vector z. In this example, the sliding window 50 spans three symbol periods and is centered on a current symbol period and extends forward and backward in time one symbol period. During each symbol period, the joint detector 14 estimated the symbols at the center of the sliding window 50.

Estimates of symbols in the sliding window 50 are computed using either the robust Verdu approach or the robust linear systems approach (block 114). In the robust Verdu approach, symbol estimates ŝ are determined by computing the matrix M from T, which is computed using either equation (6) or Eq. (8) and multiplying the combined value vector z by matrix M. This process entails inversion of the matrix T. The matrix T may optionally be scaled by Γ before multiplying the combined value vector z. In the robust linear systems approach, symbol estimation is performed by solving a system of linear equations represented by $T\hat{s}=z$ using a numerically stable linear system solver. After the symbol estimation is complete, the estimated symbols corresponding to the current symbol period are output (block 116) and the sliding window is advanced one symbol period. The process repeats each symbol period.

Figure 4:
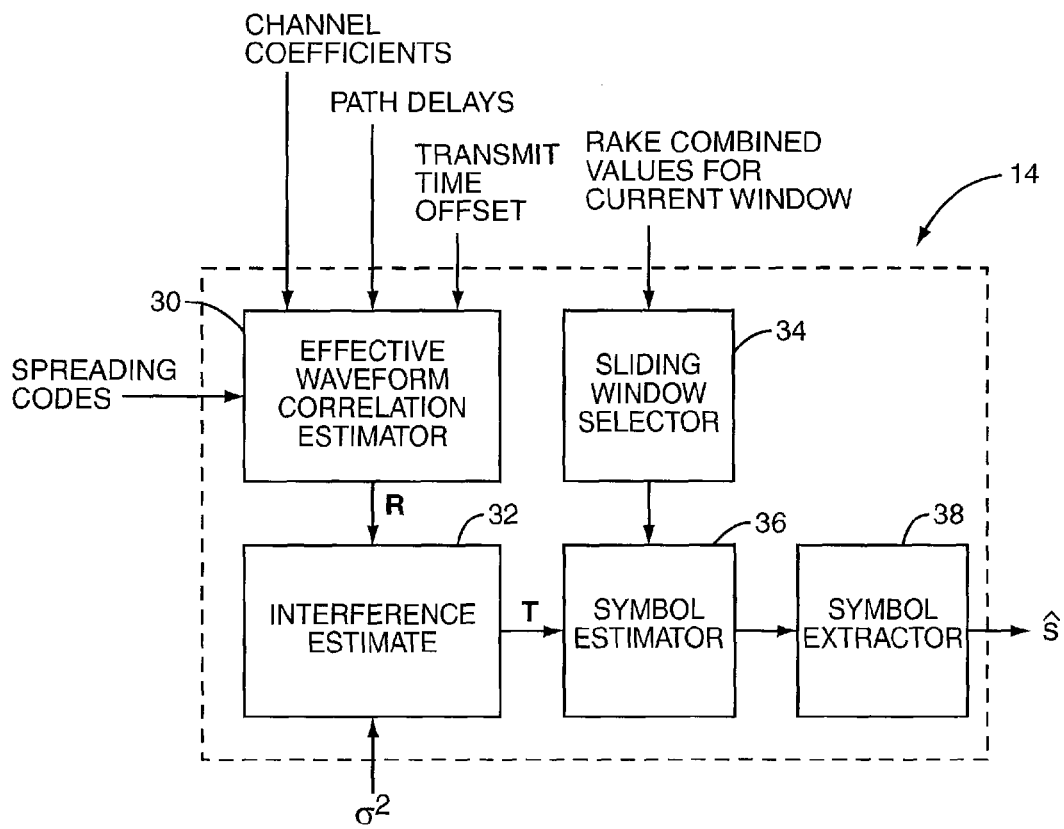
FIG. 4 illustrates an exemplary joint detector for jointly detecting symbols transmitted over multiple code channels.

FIG. 4 illustrates an exemplary multicode detector 14. The multicode detector 14 comprises a correlation estimator 30, an interference estimator 32, sliding window selector 34, symbol estimator 36, and symbol extractor 38. The waveform correlation estimator 30 estimates the effective spreading waveform correlations for the symbols in the sliding window 50 and generates the waveform correlation matrix R. The effective spreading waveform correlations may be computed, for example, from Eq. (9). The waveform correlation matrix R is input to interference estimator 32, which computes interference terms to compensate for MAI and ISI due to channel dispersion and generates the interference suppression matrix T. The symbol estimator 36 employs either the robust Verdu approach or the robust linear systems approach to estimate the symbols in the sliding window 50. The estimation process uses the interference suppression matrix T to at least partially cancel or suppress MAI and ISI due to channel dispersion. The symbol extractor 38 extracts symbols corresponding to a current symbol period and outputs the extracted symbol estimates for demodulation.

The joint detector 14 of the present invention may be employed at either a base station or a mobile terminal. Both the robust Verdu approach and the robust linear systems approach to symbol estimation are compatible with the concept of a virtual user, which facilitates implementation by a mobile terminal. In the HSDPA mode of WCDMA, the mobile terminal does not have knowledge of all of the active codes, which is necessary for the conventional MMSE approach to joint detection. However, the mobile terminal will have knowledge of the codes assigned to it, which are typically spreading codes with spreading factor (SF) 16. According to one embodiment of the present invention useful for implementation by a mobile terminal, it is assumed that all of the spreading codes with SF 16 not assigned to the mobile terminal are assigned to another virtual HSDPA user. With this assumption, the mobile terminal has all the information it needs to implement the joint detector using the robust Verdu approach or the robust linear systems approach. It should be noted that the virtual user concept is not suitable for use with a conventional MMSE detector because of the possibility that one of the unassigned codes will not be used. An unused code will cause the matrix A to become singular, which can not be tolerated in the conventional MMSE approach. In contrast, the methods employed in the present invention can tolerate singularity of the matrix A enabling use of the virtual user concept. In this case, the corresponding element in the matrix A is set to zero and causes no numerical issues because there is no need to invert the matrix.

With the virtual user concept, each SF 16 code branch of the orthogonal variable spreading factor (OSVF) code tree that is attributed to the virtual HSDPA user potentially models one or more voice users (SF=128) and/or one ore more low-rate data users (SF>16). For example, assume that four codes of length 128 that correspond to OVSF branch 15 (out of 16) are assigned to voice users. The virtual HSDPA user would be assumed to use code 15 of the set of SF 16 codes to model these voice users. The spreading waveform for this virtual user is a composite signal representing multiple voice users or low data rate users. The sum of the powers of the individual voice users would be used as the power of code 15 at SF=16. It may be noted that the virtual user concept is an approximation and will cause some performance degradation that has not been found to be significant in practice.

The multicode detector 14 described above is a single stage detector that jointly detects symbols of interest transmitted over two or more codes. The present invention may also be employed in a multi-stage detector, such as a successive interference cancellation (SIC) multicode receiver (FIG. 5) or a parallel interference cancellation (PIC) multicode receiver (FIG. 6).

Figure 5:
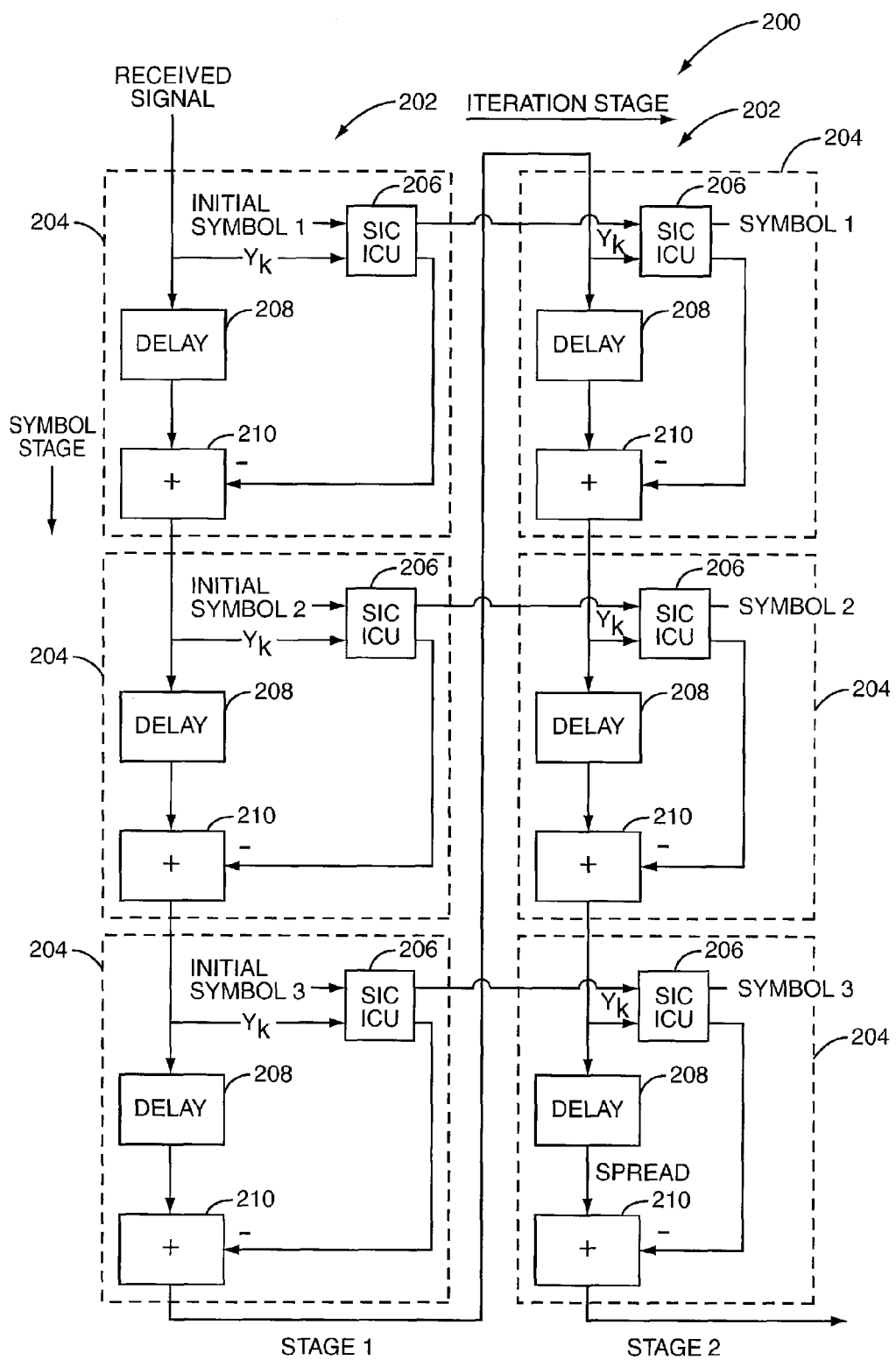
FIG. 5 illustrates an exemplary successive interference cancellation (SIC) receiver.

FIG. 5 illustrates a multi-stage successive interference cancellation (SIC) receiver 200 according to one embodiment. The SIC receiver 200 includes a plurality of iteration stages 202 to iteratively estimate symbols of interest. The received signal is sampled at the chip rate or greater by a sampling unit (not shown) and the sample stream is input to the first iteration stage 202. The input signal to each iteration stage 202 after the first iteration stage 202 is provided by the output of the previous iteration stage 202. Each iteration stage 202 comprises two or more symbol estimation stages 204 in which symbols of interest are successively detected. In each symbol estimation stage 204, one symbol is estimated and subtracted from the input signal to generate an error signal that serves as the input to the next symbol estimation stage 204. The error signal output from the last symbol estimation stage 204 is the input to the next iteration stage 202.

Each symbol estimation stage includes an interference cancellation unit 206, a delay element 208, and a cancellation unit 210. The interference cancellation unit 206 receives two inputs and generates two outputs. The inputs include a symbol estimate from a previous iteration stage 202 (or initial symbol estimate in the case of the first iteration stage 202) and an error signal from the previous symbol estimation stage 204. In the first symbol estimation stage 204 of the first iteration stage 202, the received signal serves as the error signal. The interference cancellation unit 206 outputs a revised symbol estimate to a corresponding interference cancellation unit 206 in the next iteration stage 202. Additionally, the interference cancellation unit 206 generates a cancellation signal that is used to cancel the contribution of the estimated symbol from the error signal. The error signal is delayed by delay element 208 to match the processing delay of the interference cancellation unit 206. The delayed error signal is then combined with the cancellation signal in the cancellation unit 210 to remove the contribution of the estimated signal from the error signal. The revised error signal is input to the next symbol estimation stage 204.

Figure 6:
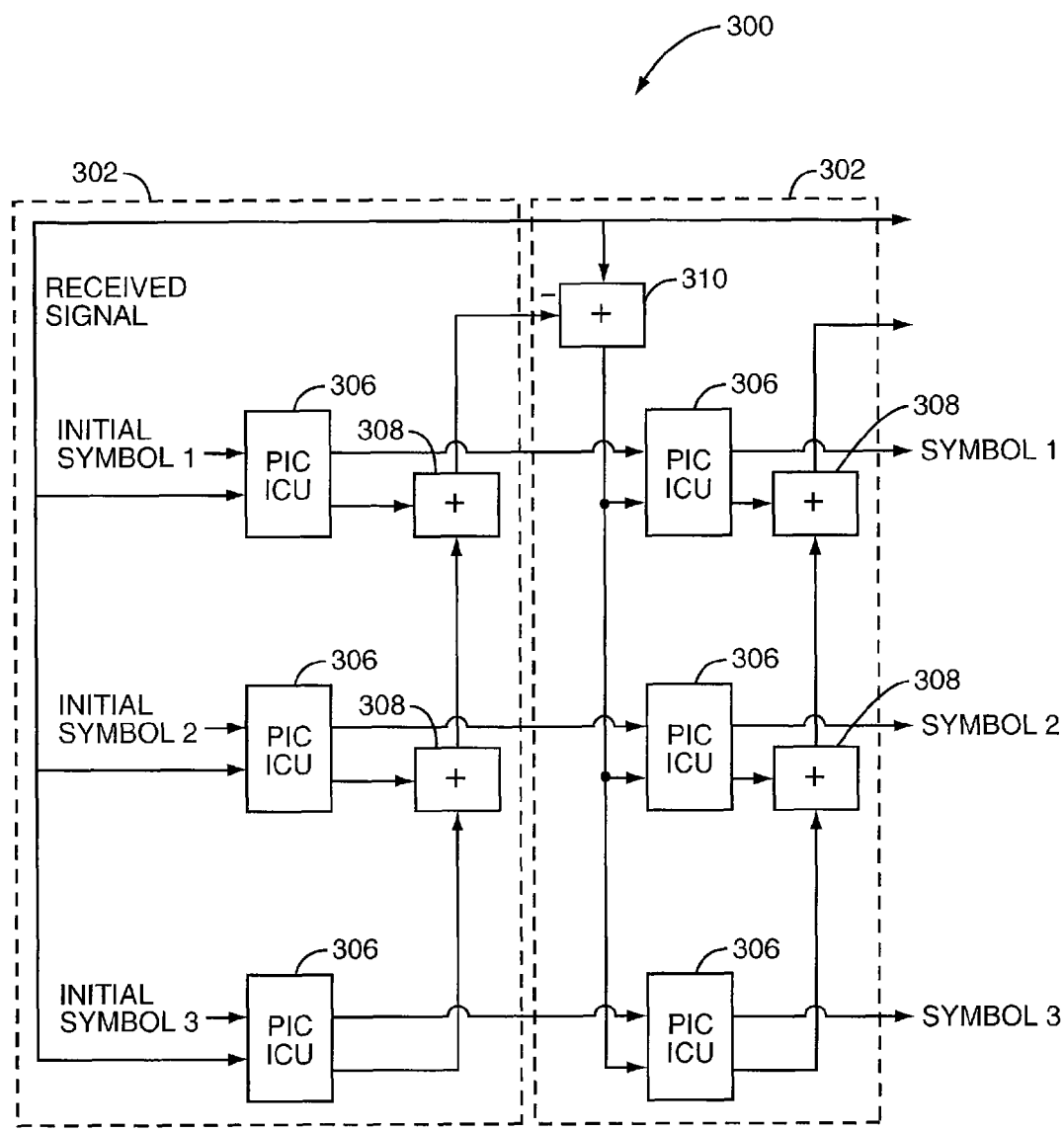
FIG. 6 illustrates an exemplary parallel interference cancellation (PIC) receiver.

FIG. 6 illustrates a parallel interference cancellation (PIC) receiver 300 according to another embodiment. The PIC receiver 300 includes a plurality of iteration stages 302 to iteratively estimate symbols of interest. The received signal is input to each iteration stage 302. Each iteration stage 302 includes a plurality of interference cancellation units 306 arranged in parallel. Each interference cancellation unit 306 estimates one symbol of interest and generates a cancellation signal. The cancellation symbols are combined in summers 308, which are arranged in series. In each iteration stage 302 after the first, a combiner 310 subtracts the summed cancellation signal generated in the previous iteration stage 302 from the received signal to generate an error signal, which is input to the interference cancellation units 306.

The interference cancellation units (ICUs) 306 in each iteration stage 302 receive two inputs and generate two outputs. The inputs include a symbol estimate from a previous iteration stage 302 (or initial symbol estimates in the case of the first iteration stage 302) and an error signal from combiner 310. In the first iteration stage 302, the received signal serves as the error signal. The ICU 306 outputs a revised symbol estimate to a corresponding ICU 306 in the next iteration stage 302. Additionally, the ICU 306 generates a cancellation signal that is summed with the cancellation signals generated by the other ICUs 306. As previously described, the summed cancellation signal is subtracted from the received signal in the next iteration stage to generate an error signal.

The robust linear system approach previously described can be modified for use in the SIC receiver 200 or PIC receiver 300. In the robust linear system approach, symbol estimates are jointly detected by solving the set of equations represented by:

$$T\hat{s} = z, \qquad \text{Eq. (10)}$$

where $$T = fRA^2 + fN_0 I, \qquad \text{Eq. (11)}$$

and f is either 1 or $1/N_0$. Gauss-Seidel or Gauss-Jordan can be used to iteratively solve Eq. (10). For the first iteration stage 202, 302, the elements in $\hat{s}$ are set to initial values, such as zero or scaled symbol estimates obtained from a RAKE or G-RAKE receiver. When f is 1, the initial symbol estimates $\hat{s}$ should be scaled by the inverse of the symbol amplitude $a_k$. With the SIC receiver, the Gauss-Seidel approach may be used to solve Eq. (10). In the Gauss-Seidel approach, the $k^{th}$ interference cancellation unit 206 solves Eq. (10) for the $k^{th}$ symbol in $\hat{s}$ using symbol estimates from the previous iteration stages 202 for subsequent symbols in $\hat{s}$, and using symbol estimates from the current iteration stage 202 for previous symbols in $\hat{s}$. Note that the Gauss-Seidel approach converges faster when the elements in $\hat{s}$ are arranged in descending order of strength. The Gauss-Jordan approach may be used to solve Eq. (10) with the PIC receiver 300. In this case, the $k^{th}$ interference cancellation unit 306 solves Eq. (10) for the $k^{th}$ symbol in $\hat{s}$ using symbol estimates from the previous iteration stages 302.

The equation used to solve the first element in $\hat{s}$ by the first interference cancellation unit 206, 306 is given by:

$$s_1 = \left(\frac{1}{a_1^2 s_{11} + N_0}\right)(z_1 - a_2^2 r_{12} s_2 - a_3^2 r_{13} s_3 - \ldots - a_{K'}^2 r_{1K'} s_{K'}), \qquad \text{Eq. (12)}$$

where $r_{uv}$ is an element in R corresponding to row u column v. These are cross correlations of effective spreading waveform for symbol u with the effective spreading waveform of symbol k. The effective spreading waveform for code k is the convolution of the transmit spreading waveform with the channel and is denoted as vector $h_k$. The cross correlation can be expressed as a vector inner product:

$$r_{uv} = h_u^H h_v. \qquad \text{Eq. (13)}$$

Also, the RAKE-combined value $z_k$ can be expressed as:

$$z_k = h_k^H r, \qquad \text{Eq. (14)}$$

where r is a vector of received chip samples from one or more antennas. Substituting Eq. (13) and Eq. (14) into Eq. (12), gives:

$$s_1 = \left(\frac{1}{a_1^2 r_{11} + N_0}\right) \qquad \text{Eq. (15)}$$

$$(h_1^H r - a_2^2 h_1^H h_2 s_2 - a_3^2 h_1^H h_3 s_3 - \ldots - a_{K'}^2 h_1^H h_{K'} s_{K'}).$$

Factoring out a common term gives:

$$s_1 = \left(\frac{1}{a_1^2 r_{11} + N_0}\right) h_1^H y_1 = q_1 h_1^H y_1, \qquad \text{Eq. (16)}$$

$$y_1 = r - a_2^2 h_2 s_2 - a_3^2 h_3 s_3 - \ldots - a_{K'}^2 h_{K'} s_{K'}. \qquad \text{Eq. (17)}$$

Observe that $y_1$ is obtained by subtracting interference terms from the chip samples. It should be noted that the interference terms are scaled by the power, not amplitude, of the interfering signal. This is also convenient as it avoids the need to take square root of a power estimate. The vector $y_k$ may be formed by subtracting all components and then adding back in the one needed to form $y_k$ as shown in Eq. (18) and Eq. (19) below:

$$v = a_1^2 h_1 s_1 + a_2^2 h_2 s_2 + a_3^2 h_3 s_3 + \ldots + a_K^2 h_K s_K \qquad \text{Eq. (18)}$$

$$y_k = r - v + a_k^2 h_k s_k \qquad \text{Eq. (19)}$$

The vector v is not an estimate of the received signal r, since it is based on interference estimates scaled by their powers rather than their amplitudes. Note that the symbols from the previous iteration stage 302 are used in the case of the PIC receiver 300. For the SIC receiver 200, symbols from both the current and previous iteration stage 202 are used. Using $\tilde{s}$ to denote the symbols considered by the $k^{th}$ interference cancellation unit 206, 306, then for the SIC receiver $\tilde{s} = [s_0^i, s_1^i, \ldots, s_{k-1}^i, s_{k+1}^{i-1}, \ldots s_K^{i-1}]$; for the PIC receiver 300, $\tilde{s} = [s_0^{i-1}, s_1^{i-1}, \ldots, s_{k-1}^{i-1}, s_{k+1}^{i-1}, \ldots, s_K^{i-1}]$. Note that the superscripts denote the iteration number. For both the SIC receiver 200 and the PIC receiver 300, the symbol estimation is given by:

$$x_k^i = q_k h_k^H y_k = q_k h_k^H (r - v(\tilde{s})) + w_k \tilde{s}_k, \qquad \text{Eq. (20)}$$

where $$w_k = q_k a_k^2 r_{kk}, \qquad \text{Eq. (21)}$$

and $$q_k = \frac{1}{a_k^2 r_{kk} + N_0}. \qquad \text{Eq. (22)}$$

Observe that $q_k$ is a function (reciprocal) of an interference rejection term, e.g., a reciprocal of a diagonal element of T in Eq. (8)).

Figure 7:
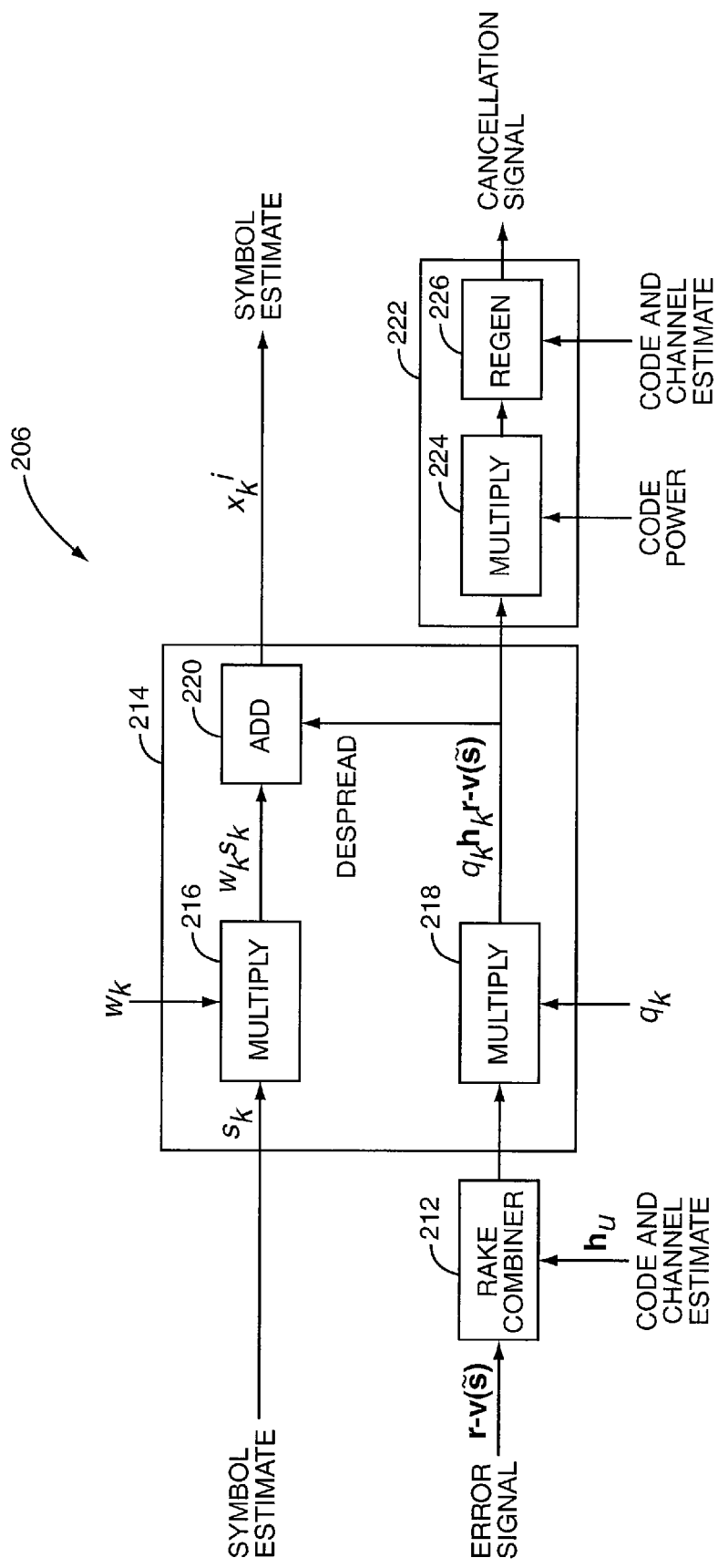
FIG. 7 illustrates an exemplary symbol estimator for the SIC receiver shown in FIG. 5 or the PIC receiver shown in FIG. 6.

FIG. 7 illustrates an exemplary interference cancellation unit 206 for a SIC receiver 200. The interference cancellation unit 206 comprises a RAKE combiner 212, a symbol estimator 214, and a cancellation signal generator 222. The error signal r−v($\tilde{s}$) is despread and RAKE combined by the RAKE combiner 212. The symbol estimator 214 includes a multiplier 216, multiplier 218, and adder 220. The symbol estimate from the previous iteration stage 202, 302 (or the initial symbol estimate) is input to the multiplier 216 and multiplied by a weighting factor $w_k$ given by Eq. (21). The RAKE combined signal from RAKE combiner 212 is multiplied by $q_k$ in multiplier 218 to obtain the product $q_k h_k^H(r-v(\tilde{s}))$. The product $q_k h_k^H(r-v(\tilde{s}))$ is then added by adder 220 to $w_k \tilde{s}_k$ to obtain a revised symbol estimate $x_k^i$.

The product $q_k h_k^H(r-v(\tilde{s}))$ is also used by the cancellation signal generator 222 to generate the cancellation signal. Specifically, the product $q_k h_k^H(r-v(\tilde{s}))$ is multiplied by a corresponding code power by a multiplier 224 and then respread and convolved with the channel response by a signal regenerator 226 to obtain the cancellation signal.

The ICU 306 for the PIC receiver 300 is similar to the ICU 206 shown in FIG. 7. The primary difference is that the output of the adder 220 in a PIC receiver ICU 306 provides the input to multiplier 224 instead of the output of the multiplier 218.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of detecting a symbol of interest comprising:
   despreading a received signal to obtain despread values corresponding to said symbol of interest and to one or more interfering symbols;
   combining the despread values to generate combined values for said symbol of interest and said interfering symbols;
   computing spreading waveform correlations between the spreading waveform for the symbol of interest and the spreading waveforms for said interfering symbols based on transmit spreading waveforms for said symbol of interest and said interfering symbols and corresponding channel estimates for said symbol of interest and said interfering symbols;
   computing interference rejection terms by scaling said spreading waveform correlations by corresponding signal powers and compensating for noise; and
   generating an estimate of the symbol of interest by combining said combined values with said interference rejection terms.

2. The method of claim 1 wherein scaling said spreading waveform correlations comprises computing scaled spreading waveform correlations as a product of said spreading waveform correlations and corresponding signal powers, and adding noise estimates to said products.

3. The method of claim 1 wherein scaling said spreading waveform correlations comprises computing scaled spreading waveform correlations as a product of said spreading waveform correlations and corresponding signal to noise ratios and adding unity to said products.

4. The method of claim 1 wherein generating an estimate of the symbol of interest comprises combining said combined values with said interference rejection terms in a joint detector.

5. The method of claim 4 wherein said joint detector comprises a minimum mean squared error detector.

6. The method of claim 1 wherein generating an estimate of the symbol of interest comprises combining said combined values with said interference rejection terms in a successive interference cancellation receiver.

7. The method of claim 1 wherein generating an estimate of the symbol of interest comprises combining said combined values with said interference rejection terms in a parallel interference cancellation receiver.

8. The method of claim 1 wherein said spreading waveforms for said interfering symbols includes a spreading waveform that represents multiple interfering symbols.

9. A receiver for detecting a symbol of interest comprising:
   a despreader to despread a received signal to obtain despread values corresponding to said symbol of interest and to one or more interfering symbols;
   a combiner to combine the despread values to generate combined values for said symbol of interest and said interfering symbols;
   a correlation estimator to compute spreading waveform correlations between the spreading waveform for the symbol of interest and the spreading waveforms for said interfering symbols based on transmit spreading waveforms for said symbol of interest and said interfering symbols, and based on corresponding channel estimates for said symbol of interest and said interfering symbols;
   an interference rejection unit to compute interference rejection terms by scaling said spreading waveform correlations by corresponding signal powers and compensating for noise; and
   a symbol estimator to generate an estimate of the symbol of interest by combining said combined values with said interference rejection terms.

10. The receiver of claim 9 the correlation estimator computes scaled spreading waveform correlations as a product of said spreading waveform correlations and corresponding signal powers and adds noise estimates to said products.

11. The receiver of claim 9 wherein the correlation estimator computes scaled spreading waveform correlations as a product of said spreading waveform correlations and corresponding signal to noise ratios and adds unity to said products.

12. The receiver of claim 9 wherein the symbol estimator comprises a joint detector for combining said combined values with said interference rejection terms.

13. The receiver of claim 12 wherein said joint detector comprises a minimum mean squared error detector.

14. The receiver of claim 9 wherein the receiver comprises a successive interference cancellation receiver.

15. The receiver of claim 9 wherein the receiver comprises a parallel interference cancellation detector.

16. The method of claim 9 wherein said spreading waveforms for said interfering symbols includes a spreading waveform that represents multiple interfering symbols.

* * * * *

UNITED STATES PATENT AND TRADEMARK OFFICE
CERTIFICATE OF CORRECTION

PATENT NO. : 7,873,098 B2  Page 1 of 1
APPLICATION NO. : 11/739126
DATED : January 18, 2011
INVENTOR(S) : Cairns et al.

It is certified that error appears in the above-identified patent and that said Letters Patent is hereby corrected as shown below:

On the Face Page, in Field (56), under "OTHER PUBLICATIONS", in Column 2, Line 2, delete "Transcations" and insert -- Transactions --, therefor.

In Column 12, Line 35, in Claim 10, delete "claim 9 the" and insert -- claim 9 wherein the --, therefor.

Signed and Sealed this
Seventeenth Day of May, 2011

David J. Kappos
*Director of the United States Patent and Trademark Office*